UNITED STATES PATENT OFFICE.

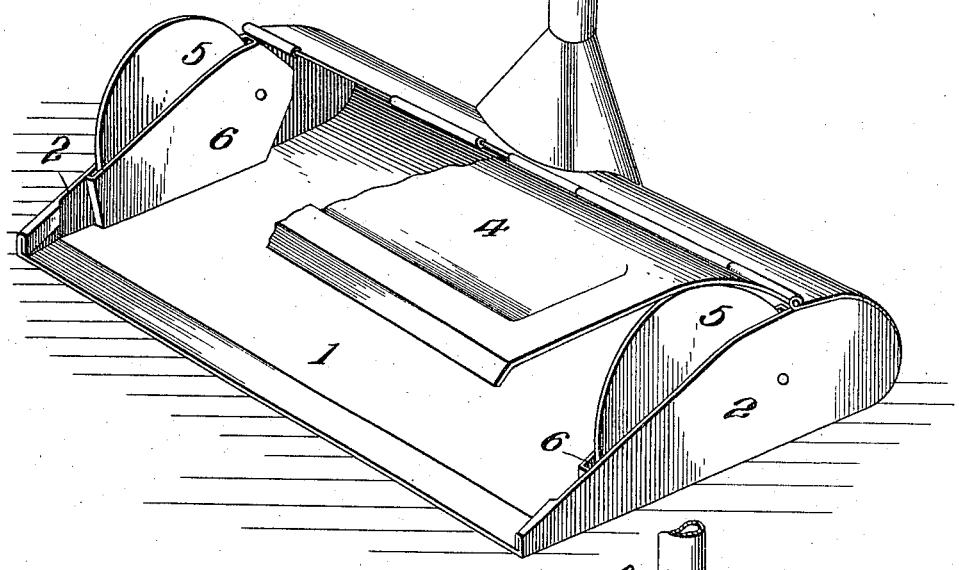

CHARLES E. SCHAFFNER, OF WASHINGTON, DISTRICT OF COLUMBIA.

DUST-PAN.

1,178,353. Specification of Letters Patent. Patented Apr. 4, 1916.

Application filed April 7, 1915. Serial No. 19,684.

*To all whom it may concern:*

Be it known that I, CHARLES E. SCHAFFNER, of Washington, in the District of Columbia, have invented certain new and useful Improvements in Dust-Pans; and I do hereby declare the following to be a full, clear, and exact description of the invention, such as will enable others skilled in the art to which it appertains to make and use the same.

The primary object of this invention is to provide a dust-pan having a hinged lid or cover with improved means for automatically raising the cover from the pan as the latter is positioned on the floor, the cover-raising means being so constructed and arranged as to avoid the possibility of any of the sweepings falling through the bottom of the pan.

In the accompanying drawings, Figure 1 is a view in perspective with part of the cover broken away. Fig. 2 is a side elevation showing the cover lowered. Fig. 3 is a view showing the cover raised.

Referring to the drawings, 1 designates the body of the dust-pan which is shown as comprising a bottom and two vertically disposed parallel side walls 2. From the rear end of the pan extends an elongated handle 3 by which the pan may be transported from place to place. The back end of the pan is rounded by bending the bottom upwardly and forwardly, and to the front edge of this forwardly bent portion is hinged the lid or cover 4 which when lowered entirely incloses the top of the pan, the forward free end of the cover being contiguous to the forward end of the bottom.

5 5 designate two cover-raising members which are shown in the form of cams pivoted in pockets in the side walls of the pan, said pockets being formed by plates 6 secured to the inner faces of the side walls. Slots are formed in the bottom of the pan, coincident with these pockets, so that the cams may extend therethrough. Normally, when the pan is raised, the cams being projected through the slots the cover will be in its lowered position, but when the pan is placed on the floor the cams will be moved upwardly since they contact with the floor before the pan, and in moving upwardly will raise the lid or cover a sufficient distance to permit dust or sweepings to be received on the pan. None of the material collected on the bottom of the pan can fall therethrough since the slots formed to accommodate the cams are guarded by the plates 6.

The advantages of my invention will be readily appreciated by those skilled in the art. The lid raising means will not in any way injure the floor or carpet, since engagement is had over an extended surface and as soon as the pan is lowered the cover will be automatically raised, and when the pan is lifted the cover will be automatically closed.

I claim as my invention:

1. In a dust-pan having a bottom and side walls, a hinged lid or cover, pockets in said side walls, and vertically movable members mounted in said pockets and normally extended beneath the bottom of the pan.

2. A dust-pan having a bottom and side walls, a cover, plates secured to said side walls forming pockets, slots being formed in said bottom coincident with said pockets, and cam plates pivotally mounted in said pockets and designed to extend through said slots and to raise said cover when said pan is positioned on the floor.

In testimony whereof, I have signed this specification in the presence of two subscribing witnesses.

CHARLES E. SCHAFFNER.

Witnesses:
 JUDSON D. COBB,
 ARTHUR J. WAND.

Copies of this patent may be obtained for five cents each, by addressing the "Commissioner of Patents, Washington, D. C."